United States Patent
Baker et al.

(12) 
(10) Patent No.: US 6,292,494 B1
(45) Date of Patent: Sep. 18, 2001

(54) CHANNEL HOPPING PROTOCOL

(75) Inventors: Murray C. Baker, Toronto; Alan C. Chau; John V. Taglione, both of Scarboro; Aron D. Wallaker, North York, all of (CA)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 08/994,297

(22) Filed: Dec. 19, 1997
(Under 37 CFR 1.47)

(30) Foreign Application Priority Data

Dec. 24, 1996 (CA) .................................................. 2194023

(51) Int. Cl.[7] .............................. H04L 12/43; A61F 2/06
(52) U.S. Cl. ............................................. 370/459; 375/132
(58) Field of Search ...................................... 370/322, 338, 370/445, 447, 448, 461, 462, 471, 474, 459; 375/132, 356, 364, 134, 137, 347; 340/825.5, 825.25

(56) References Cited

U.S. PATENT DOCUMENTS

| | | | |
|---|---|---|---|
| 4,516,239 | * 5/1985 | Maxemchuk | 370/445 |
| 5,012,469 | * 4/1991 | Sardana | 370/322 |
| 5,172,375 | * 12/1992 | Kou | 370/322 |
| 5,408,496 | * 4/1995 | Ritz et al. | 375/202 |
| 5,504,750 | * 4/1996 | Fulghum et al. | 375/132 |
| 5,519,706 | * 5/1996 | Bantz et al. | 455/435 |
| 5,673,031 | * 9/1997 | Meier | 340/825.08 |
| 5,726,984 | * 3/1998 | Kubler et al. | 370/349 |
| 5,956,325 | * 9/1999 | Citta et al. | 370/322 |
| 5,966,665 | * 10/1999 | Taki | 375/132 |
| 5,987,032 | * 11/1999 | Nadgauda et al. | 370/437 |
| 6,014,406 | * 1/2000 | Shida et al. | 375/202 |
| 6,028,853 | * 2/2000 | Haartsen | 370/338 |
| 6,081,514 | * 6/2000 | Raith | 370/322 |

* cited by examiner

Primary Examiner—Melvin Marcelo
Assistant Examiner—Phuongchau Ba Nguyen
(74) Attorney, Agent, or Firm—Douglas W. Cameron; Anne Vachon Dougherty (57) ABSTRACT

A method and means for information transmission over a medium for a wireless communication system comprising a network of stations capable of sending and receiving data transmissions over a number of communication channels. The method includes sending a data transmission in a packet including a header and a data portion, the header includes identification (ID) of the network; identification of the next channel to be used in communications; an address; a channel busy count field; and a network command.

21 Claims, 3 Drawing Sheets

CHANNEL HOPPING PROTOCOL

FIELD OF THE INVENTION

This invention relates to wireless networks such as networks of data processing stations interconnected by radio frequency or infrared links.

BACKGROUND OF THE INVENTION

In the transmission of data over wireless networks such as radio frequency networks or infrared networks, problems with noise at different frequencies or on different channels can pose problems for communications. Therefore it has been proposed to establish data processing networks using wireless links that will hop over different frequencies or radio frequency or different wavelengths of infrared light. These will be referred to as different channels. As noise may only be present on one or a few channels, if the network changes channels periodically it will reduce the impact of the selection of noisy channels. However, it is; important that, when a station transmitting data intends to change channels, all of the stations of the network likewise change channels so that they will all be corresponding or communicating on the same channel at such time that a channel is changed.

U.S. Pat. No. 5,130,987, issued Jul. 14, 1992, and assigned to Metricom, Inc., depicts radio communication systems using channel hopping, however the transmission of information does not include the address of the domain ID of the network being used and so would encounter conflicts with other nearby networks. In addition, the transmitting station does not inform the receiving stations to which channel they should next hop. An aging field is used to time hop during normal communication. The foregoing pose limitations which are avoided by the present invention.

SUMMARY OF THE INVENTION

It is an object of the invention to establish a protocol including a method of operating a network that uses channel hopping; as well as to establish means, including software, to implement operation under the protocol of the invention.

One aspect of the invention provides a method of information transmission over a medium for a wireless communication system of a network of stations capable of sending and receiving data transmissions over a number of communication channels of the medium. Data transmission is sent in packets, with each packet including a header and a data portion. The heading includes identification (ID) of the network, identification of the next channel to be used in communications, an address, a channel busy count field, and a network command. The data portion is used to contain data.

The protocol of the invention establishes and maintains communications between stations or members of the network. The protocol established by this invention is adapted to manage a number of stations on a peer-to-peer basis. Higher network functions are performed by upper layers of software used by the stations in the networks and are not addressed in this application.

BRIEF DESCRIPTION OF THE DRAWINGS

The invention will now be described in greater detail with specific reference to the appended drawings wherein.

DETAILED DESCRIPTION OF THE INVENTION

The basic elements of one embodiment of the protocol of the invention are the following:

(1) Each domain or station supports a peer-to-peer ad hoc network where each station is identical in communication stature. No one member acts as a base station controlling the network traffic and channel allocations.

(2) Each station hops between a group of assigned channels.

(3) The transmitting station assigns the next hop channel. All stations monitor the network packet header for the next hop channel.

(4) Each station must find and synchronize with the network.

(5) Each group of stations will have a unique assigned DOMAIN ID.

(6) Each group of stations will have a unique Channel Hop Table which will contain the order of the channels. Each next hop will use the next channel in the Hop table.

All stations maintain their own copy of the Channel Hop Table.

DOMAIN ID is used as the seed for pseudo-random generation of the Channel Hop Table. With the same seed, all the Hop tables will be identical.

(7) Periodic channel activity is used to maintain contact between stations needed to maintain synchronization after periods of channel inactivity.

channel activity is triggered by a watchdog timer.

each station has its own independent watchdog timer.

the first watchdog timer to expire triggers the channel activity.

when channel activity is detected, the watchdog timer is reset.

(8) The hidden or lost stations or nodes are handled as follows:

Collisions will be reduced because of channel hopping.

Lost stations will attempt to re-synchronise up as each station is responsible for maintaining contact with the network.

(9) The Physical Protocol Layer will support:

Carrier Sense with Multiple Access with Collision Avoidance (CSMA/CA) must be used when on a single channel wireless medium such as RF or IR.

will perform the collision avoidance functions such as Listen, Send/Back off, and Retry.

(10) Network Management commands are used to manage the wireless link independent of the upper protocol layers.

Protocol Data Formats and Control Tables

The protocol supports the following formats for its tables and packets.

TABLE 1

Generalized Protocol Packet Format

| PREAMBLE | N BYTES | |
|---|---|---|
| Delimiter | 1 byte | ⎫ |
| Domain ID | 2 bytes | ⎪ |
| Next Hop Channel | 1 byte | ⎬ Network |
| Channel Busy Count | 1 byte | ⎪ Protocol |
| Dest/Source Address | 6 bytes | ⎪ Header |
| Network Command | 1 byte | ⎪ |
| Network Header CRC | 1 byte | ⎭ |
| Data Packet | | ⎫ Portion |
| | | ⎬ Defined by |
| | | ⎪ Higher Level |
| | | ⎪ Protocol |
| | | ⎭ (MAC Frame) |

Preamble

The Preamble is used to allow the receiving device to perform functions such as Automatic Gain Control and clock synchronization. The length of the preamble is determined by the characteristics of the receiver and is tailored to the physical implementation of the receiver.

Delimiter

The Delimiter is used to indicate the beginning of the network header.

Domain ID

The purpose of the Domain ID is to allow coexistence of several groups of users or domains. The Domain ID is used to identify the packets which belong to a specific group. If a station is within range of two domains, there is the probability that it will receive a packet from the domain of which it is not a member. If such a packet were accepted, the station would then join the other domain and could lose its group.

The use of a Domain ID will prevent this and the two domains could coexist with only an occasional conflict, easily resolved without disrupting both domains.

Next Hop Channel

The Next Hop Channel field is used to keep the members of a domain in step by indication of the next channel which will be used. This field will correspond to the next channel in the hop table for each of the members of the same domain.

Channel Busy Count (CBC)

The Channel Busy Count (CBC) is used to indicate the duration of a data transmission. It is a count of the number of time slots reserved on a channel. The time slot value is based on the time required to send the maximum length of data packet supported in a single transmission. The CBC controls a station's response to a packet transmission. If the value of the CBC field is zero, then the Next Hop Channel field is used for the next channel and the hop is taken after the packet is received. The station remains on the current channel if the CBC value is greater than zero, and the Destination address matches the station address or is a broadcast address. Otherwise, the station hops and waits on the new channel for a time period determined by the CBC value. The foregoing is shown in Table 2.

TABLE 2

Channel Busy Count Field Usage

| CBC | Destination/Source Address | | Broadcast |
|---|---|---|---|
| Value | Match | No Match | Address |
| 0 | HOP | HOP | HOP |
| NOT 0 | NO HOP | HOP & WAIT | NO HOP |

Destination/Source Address

The Destination/Source Address field is used with the Network Command to contain either the address of the location where the packet originated or the target address packet. The Network Server have a reserved address of "0xFPFFFFFFFFFF".

Network Commands

The Network Commands are used to indicate the function to be performed by the packet. The supported functions are:

DATA TRANSFER - 0x00
    This packet will contain a data packet to be transferred between stations.
SYNC REQUEST - 0x01
    This packet is used to synchronize with the network.
SYNC ACKNOWLEDGE - 0x02
    This packet is sent as a response to s SYNC REQUEST.
SERVER BEACON - 0x83
    This packet is sent periodically by the domain server.
SERVER SYNC REQUEST - 0x84
    Used to request the server address.

Network Header Cyclical Redundancy Check (CRC)

The Network Header CRC is used for data integrity checking of the Network Protocol header.

Data Packet

The data packet portion of a packet being transmitted may include data for use by the receiving station. If the information in a packet is intended for use on a network to which the receiving station is connected, the data packet portion may consist of a complete network packet, such as a Token Ring packet for use on a Token Ring network or an Ethernet packet for use in an Ethernet network. The Token Ring and Ethernet packets will not be discussed in further detail, as they are well appreciated by those skilled in the art of those types of networks.

Network Packet Formats

SYNC REQUEST Packet Format

This packet is issued when a station is attempting to join a domain for the first time or is rejoining a domain after it has lost the network.

TABLE 3

SYNC REQUEST Packet Format

Preamble
Delimiter
Domain ID
Next Hop Channel
Channel Busy Count = 0
Dest Address =
    FFFFFFFFFFFF
    or Server's Address
SYNC Request
CRC

SYNC ACKNOWLEDGE Packet Format

This packet is issued as a response to a SYNC REQUEST by the first station in a domain which can respond to the request.

TABLE 4

SYNC ACKNOWLEDGE Packet Format

Preamble
Delimiter
Domain ID
Next Hop Channel
Channel Busy Count = 0
Dest Address =
  FFFFFFFFFFFF
SYNC ACKNOWLEDGE
CRC

Data Transfer Packet Format

This packet is used to transfer packet data between stations.

TABLE 5

Data Transfer Request Packet Format

Preamble
Delimiter
Domain ID
Next Hop Channel
Channel Busy Count = n
Dest Address
DATA TRANSFER
CRC
Data Packet

Server Beacon Packet Format

This packet is used by the domain server to indicate its presence.

TABLE 6

Server Beacon Packet Format

Preamble
Delimiter
Domain ID
Next Hop Channel
Channel Busy Count = 0
Server Address
SERVER BEACON
CRC

SERVER SYNC REQUEST Packet Format

This packet is issued when a station requests the server address for the domain. The server will respond with a SYNC ACKNOWLEDGE which will contain the server address.

TABLE 7

SERVER SYNC REQUEST Packet Format

Preamble
Delimiter
Domain ID
Next Hop Channel
Channel Busy Count = 0
Dest Address = FFFFFFF
SERVER SYNC REQUEST
CRC
Data Packet

Station Hop Channel Table

A copy of the Station Hop Channel Table is maintained in each station. The Hop channel sequence is generated using a station. The Hop channel sequence is generated using a pseudo-random generator using the DOMAIN ID as the seed. This insures that all the station hop tables in a Domain will be identical. The other fields in the table are used to track the state and usage of each channel on a real time basis.

TABLE 8

Station Hop Channel Table

| CHANNEL | TIC COUNT | TIME STAMP | BAD COUNT |
| --- | --- | --- | --- |
| N(0) | TIC 0 | TOD 0 | count |
| N(1) | TIC 1 | TOD 1 | count |
| N(2) | TIC 2 | TOD 2 | count |
| N(n) | TIC n | TOD n | count |
| 1 byte | 2 bytes | 2 bytes | 1 byte |

TIC = Time in Channel
TOD = Time of Day

Timers

Timers are embodied in the stations of the network. They are described as follows:

System Watch Dog Timer

This timer is used to maintain contact with the rest of the network. If the timer expires before any activity is monitored on the network, the station assumes that it has lost the network and begins to search for the current network channel. The timer uses the detection of a transmission to start and stop the counter. When a transmission is not detected, the counter begins to count down from its maximum value. When a transmission is detected, the counter is reset.

System Response Timer

This timer is used as part of the synchronization protocol handshake to indicate when a station has timed out. This is different from the Watch Dog Timer in that it has a much smaller value and is used on every SYNC REQUEST transmission. The timer is started when the no transmission is detected and is reset when a transmission is detected. The timer is used by the SYNC REQUEST command to determine if the SYNC ACKNOWLEDGE has timed out.

Time-of-Day Timer

The Time-of-Day timer is used as the time stamp for channel usage.

Network Timing Considerations

In some instances, it is desirable to place a limit on the time a station will reside on any one channel. It may be desirable to attempt to use all the channels equally. This can be used to minimize interference with other domains or devices which are operating in the same frequency band. If a constraint is placed on how long a channel can be used for transmissions within a pre-determined time period, a Time-of-Day timer can be used to keep track of channel usage. The Time-of-Day values are stored in the station's Hop Channel Table with the corresponding channel.

The mechanism to control the channel usage is as follows: initially, all table entries are reset to zero. Beginning with the first transmission on a channel, the TOD timer value is used as the time stamp. The network steps through the Channel Hop table entries until the channels are cycled back to the first entry. Upon cycling back to the first entry, the current TOD is compared to TOD' (the TOD entry in the table). Under a spectrally balanced system, the time to cycle through all channels will be a pre-determined Cycle Time/ Number of Channels.

Time Limiting

The following pseudocode illustrates a method of limiting the time a station stays on a channel.

Channel Time Limit=Channel Cycle Time Limit/Number of Channels
if (TOD—TOD')<Channel Time Limit wait (Channel Time Limit—(TOD—TOD'))
else continue as usual It is felt that a scenario in which long periods of waiting occur is not likely. Based upon this assumption, the algorithm above is able to be kept to a straightforward level. It should also be noted that if a station is in a wait state, other stations can still transmit as long as they are not in violation of the algorithm. The station(s) in a wait state must then switch to receive mode in order to process the newly transmitted data. During station initialization, the SYNC REQ/ACK transmission will not be monitored for bandwidth usage.

Network Protocol States

Figure 1:
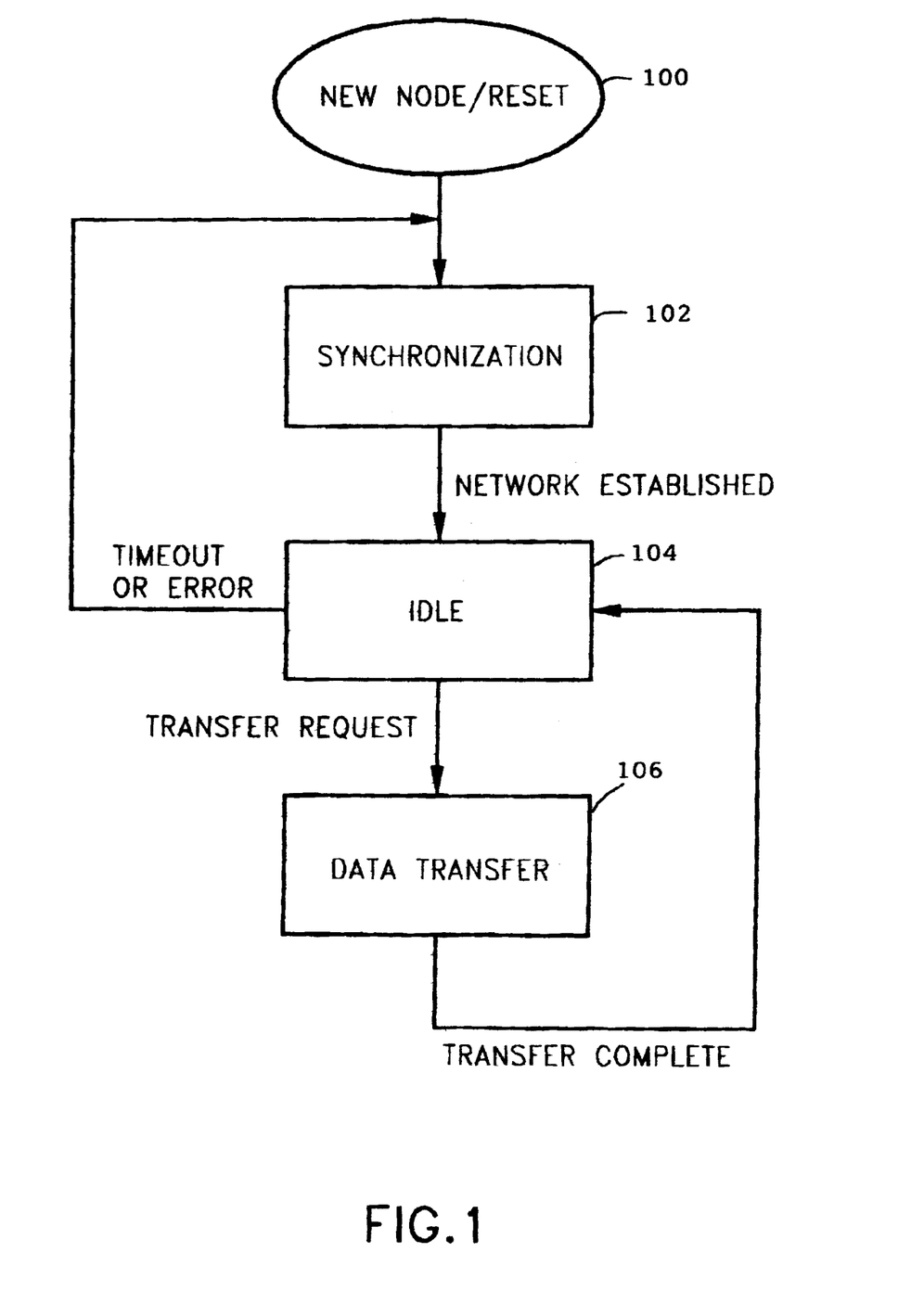
FIG. 1 depicts a flowchart illustrating the protocol state transitions of the major states of a process using the invention.

Referring to FIG. 1, the protocol states that a station can be in are:

Synchronization
Idle
Data Transfer
Synchronization State

The Synchronization (SYNC) State is used by a station to locate the network. A station enters the SYNC state when, it is first powered on, an unrecoverable error occurs, or the station has lost the network. To guarantee the cohesiveness of the network, it is necessary to periodically force the SYNC state on the network. The reason is to maintain contact between the stations on an idle network and to recover any station which has become lost. Network activity is triggered whenever the Watchdog Timer in any station expires. At that point, the station begins the re-sync process by broadcasting a SYNC REQ.

Any station can respond with a SYNC ACKNOWLEDGE which is received by the other stations. When an ACK is received, no further SYNC ACKs are sent. The SYNC REQ and SYNC ACK are done on the same channel and the hop to the next channel will occur after the ACK. The SYNC REQUEST will specify a Hop Channel equal to the current channel and the SYNC ACK will choose the next hop channel.

TABLE 9

SYNC REQUEST-SYNC ACKNOWLEDGE Example

| Source | Channel | MAC Cmd | Network Cmd | Hop channel | Address | CBC |
|---|---|---|---|---|---|---|
| A | f(0) | — | SYNC REQ | f(0) | FFFFFFFF | 0 |
| B | f(0) | — | SYNC ACK | f(1) | FFFFFFFF | 0 |
| n | f(1) | * | * | f(2) | x | n |

*depends on next system instruction

Once a station has located and jointed the network, it enters the idle state.

Idle State

The station will remain in the idle state until either a TIME OUT or error is detected, at which time it will enter the SYNC state. Otherwise, it will enter the Data Transfer State if a data transfer request is received.

Data Transfer State

The Data Transfer state is used to send data between stations and is entered when a data transfer is received. The data transfers are single transmissions and are not acknowledged at the network layer. The data frames are passed directly from MAC layer to MAC layer. The data frames are broken up into smaller packets for transmission and reassembled by the MAC layer. Error recovery is not done at the network layer, as a data transfer is considered complete once the packet is transmitted. If a data packet is lost or corrupted, the error handling is done by the MAC layer.

The transmissions of the packets of a MAC frame are "chained" at the network layer by using the Channel Busy Count (CBC) field. The two stations involved in the data transfer will remain on the one channel and will not hop to the next channel until the MAC frame transfer is complete. The receiving MAC layer will return a MAC acknowledgement containing the status of the frame packet transmission.

All other stations will hop to the next hop channel after the first packet is transmitted, and then wait for the completion of the data transfer. The wait period is determined by value of the CBC field. Should any SYNC REQ be received during the wait period, it will be ignored by all stations.

The data in the network header is used to set the response of each station in the domain during the data transfer. Only the transmitting station and the station identified in the Destination/Source Address field will remain on the current channel. All other stations will hop to the new channel. The stations doing the data transfer will only hop when the CBC field is equal to zero. The next hop channel chosen at the beginning of the transfer will be carried during the entire transfer, even by the MAC acknowledgement.

TABLE 10

Data Transfer Example-Station A to Station B-
MAC Frame = 3 Data Packets

| Source | Channel | MAC Cmd | Network Cmd | Hop Channel | Address | CBC |
|---|---|---|---|---|---|---|
| A | f(0) | DATA | Data Xfer | f(1) | B | 3 |
| A | f(0) | DATA | Data Xfer | f(1) | B | 2 |
| A | f(0) | DATA | Data Xfer | f(1) | B | 1 |
| B | f(0) | ACK | Data Xfer | f(1) | A | 0 |
| n | f(1) | * | * | f(2) | X | n |

*depends on next system instruction

Once the data transfer is complete, the station will return to the idle state.

Network Initialization

The need for a base station is avoided by having the transmitting station select the next hop channel. This requires that the stations stay in sync with the rest of the network. Also, only one conversation can occur on the network at a time despite the number of channels available.

The following approach is used to start the network initially, re-sync the stations if the network breaks up, or add a new station to a network: the station will enter the SYNC state of the protocol.

Figure 2:
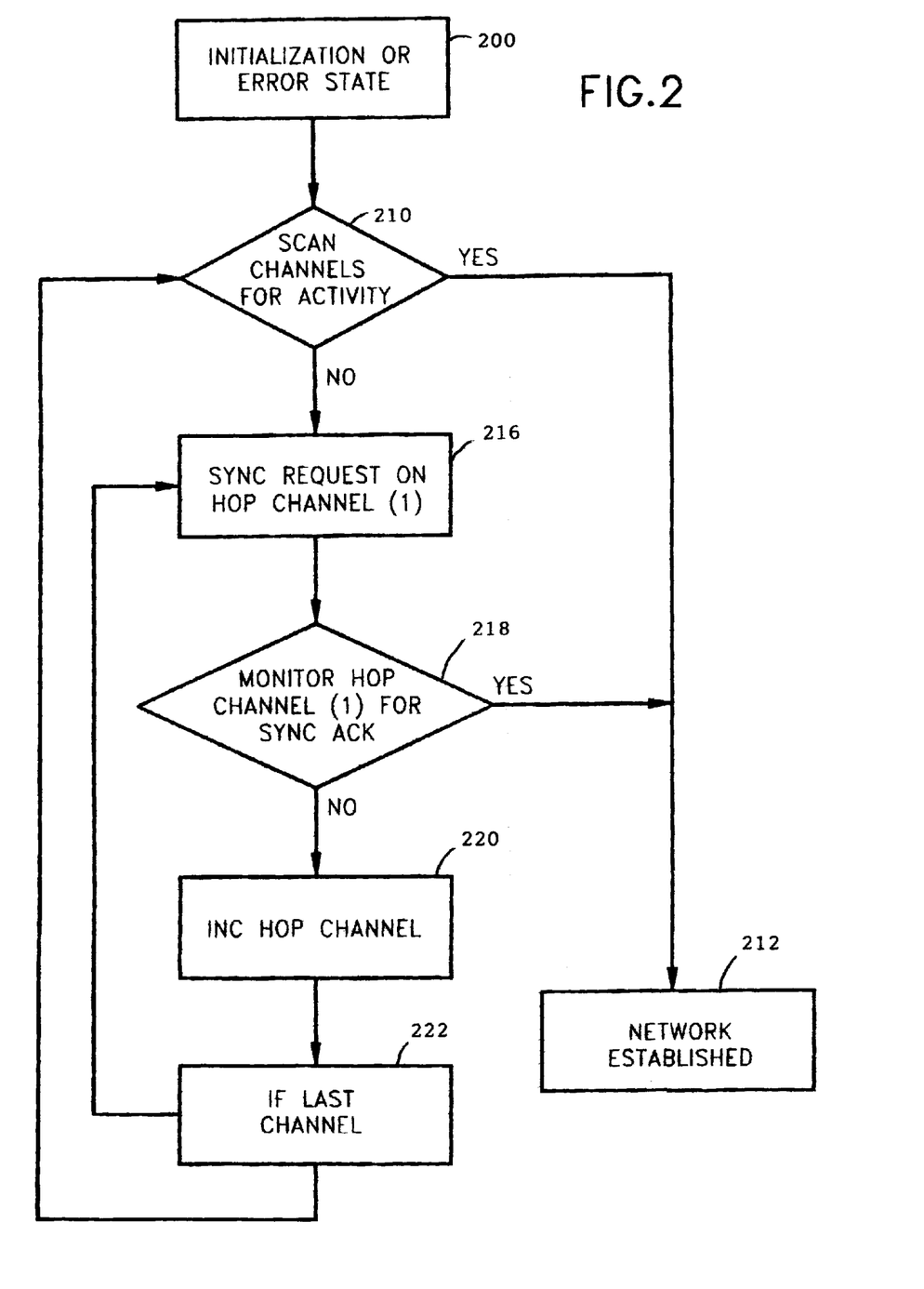
FIG. 2 depicts a flowchart illustrating the initialization/synchronization of a station with a network utilizing the protocol of the invention.

The flow diagram of the Synchronization/Initialization protocol is shown in FIG. 2. The station begins at 200 a search for the network in two steps. First, the station does a scan at 210 of the entire band for a transmission from any station. If a transmission is heard, the station can join the network at 212 by hopping to the next channel in the hop table when the transmission is complete. This is possible because the stations in the same domain use a common hop table, reducing the time require to synchronize.

Secondly, if no transmission is heard, the station selects a channel. A SYNC REQUEST packet is transmitted on this channel at 216 and the station monitors this channel for a SYNC ACK at 218. If a SYNC ACK response is received, the network can be established at 212. If no activity is detected by the time the System Response timer expires, the station continues by transmitting its SYNC REQUEST on the next channel, monitoring the channel for a response packet, transmitting on the next, monitoring, etc. stepping through the entire band until its last channel at 222.

If a station has detected a broadcast, it hops to the next: channel in its hop table at 220. If the packet header was not captured, the packet will be ignored, the watch dog timer in the station will expire, and the station will begin the search for the network again.

For the first station on the network, there is no other station to respond to its SYNC REQUEST. In such a case, the station will go alternately through the SYNC state and the idle state until a second station enters the network.

Provisions for a Domain Server

In some networks, the situation will arise when one of the members of the network is a server or access point. This station will need to be treated in a slightly different manner from the other members of the network. The nature of a server or access point requires it to have a priority in remaining in sync with the network. When a station becomes lost and re-syncs to the network, it must also ensure that it has located the server.

TABLE 11

Server Network Command

| Command | Server Command |
|---|---|
| Data Transfer | 80 0 x |
| SYNC REQ | 81 0 x |
| SYNC ACK | 82 0 x |
| Server Beacon | 83 0 x |
| Server SYNC REQ | 84 0 x |

The presence of the server is indicated by a server flag which is the most significant bit (MSB) of the Network Command field in the network protocol header. This indicates to the receiving stations that there is a server in the network. The advantage is that the need for the server to send a Server Beacon command is reduced if there has been activity on the network. This will reduce the throughput overhead imposed on the domain by having a server.

Server Registration

There will be a limit that only one server can exist in a domain at one time. If a second server attempts to establish itself as the server for the domain, it will be rejected and treated as an ordinary member of the domain. If the current server either powers down, leaves the domain, or chooses not to be a server, the next server attempting to establish itself will be accepted. This will allow dynamic configuring of the domain server without the need for administrative functions before establishing the domain.

A server identifies itself by issuing a SYNC Beacon command and the Destination/Source Address field set to the server's address. This is a broadcast command which does not require an acknowledgement and the server address can be extracted from the Destination/Source address field. The Channel Busy Count field is set to zero so all stations will hop to the next channel after the SYNC Beacon is received. The server will issue the SYNC Beacon periodically to inform the domain that it is still active. If the SYNC Beacon is not received by the other station in the domain in a predetermined period of time, the server is considered to have left the domain. The next station to issue a Server Beacon will be accepted as the server for the domain.

TABLE 12

SYNC Beacon Example

| Source | Channel | MAC Cmd | Network Cmd | Hop Channel | Address | CBC |
|---|---|---|---|---|---|---|
| A | f(0) | — | SYNC Beacon | f(1) | A | 0 |
| n | f(1) | * | * | f(2) | X | n |

* depends on next system instruction

SYNCHRONIZATION With a Server

Figure 3:
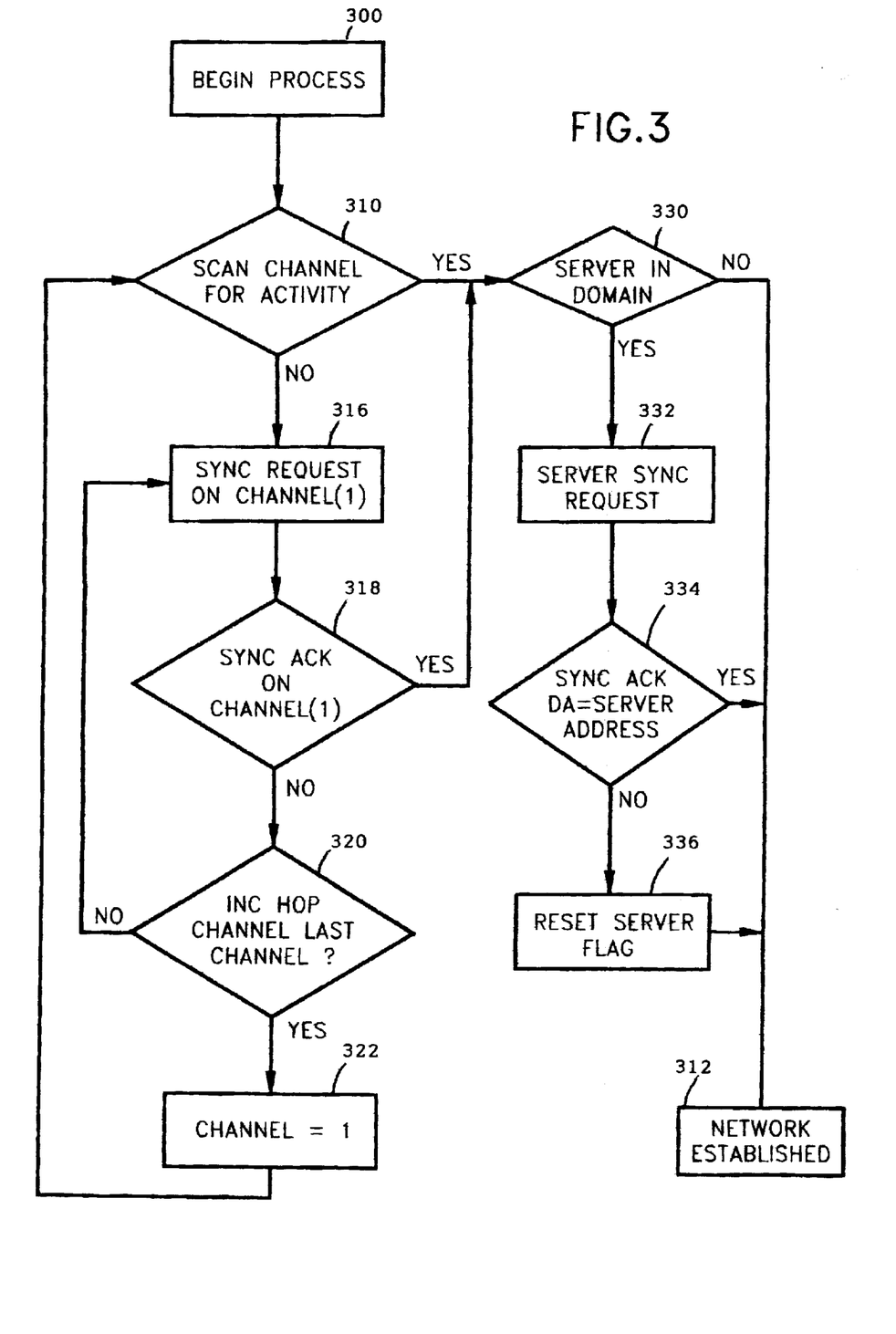
FIG. 3 depicts a flowchart illustrating the synchronization of a server with a network using the protocol of the invention.

Referring to FIG. 3, it can be seen that the inclusion of a server in a domain affects the SYNC process. The station re-establishing its contact with the domain must also guarantee that it has also established contact with the Server. The synchronization process begins at 810 the same as in the case without a server. The channel is scanned for activity at 312 and, if a transmission is detected, the station hops to the next channel in the hop table. If the server flag that indicates that there is a server in the domain is set as determined at 330, it will then issue a Server SYNC REQUEST. The server will then issue the SYNC ACK with the destination address (DA) set to the server address the network is established at 314 and the process is complete.

If no transmission is heard, the station selects a at 316 channel. A SYNC REQUEST packet is transmitted on this channel and the station monitors this channel for a SYNC ACK at 318. If a SYNC ACK response is received, the network can be established. If the server flag that indicates that there is a server in the domain if; set, the station will issue a Server SYNC REQUEST at 332. The server will then issue the SYNC ACK (with the destination address set to the server address at 334) and the process is complete with the resetting of the server flag at 336.

If no activity is detected by the time the System Response timer expires, the station continues by transmitting its SYNC REQUEST on the next channel, monitoring the channel for a SYNC ACK, and continually stepping through the entire band until the last channel is determined at 320 wherein the channel is set to 1 at 322.

If a station has detected a broadcast, and if the packet header was not captured, the packet will be ignored. In this case, the watch dog timer in the station will expire and the station will begin the search for the network again.

Handling Error Conditions

Determining/Avoiding Bad Channels

A channel can have interference and be unusable. A channel is considered bad if a transmission is detected but data cannot be extracted from the transmission. To handle the case in which the interference on a channel is temporary, the BAD channel indicator is a counter. The counter is incremented when a bad transmission is received. If the number of bad transmissions exceeds a preset limit, the channel is permanently marked bad and skipped on all further transmissions. If a good transmission is received on a channel, the counter is reset to zero. If the number of available channels falls below a predetermined limit, the previously marked channels are retried.

If interference is experienced on a transmission, the receiving stations increments the bad transmission count in their channel hop tables. The transmitting station proceeds as if the transmission was received and hops to the next hop channel. The receiving stations hop to the next channel in the hop table when transmission is no longer detected. The lost packets are recovered by the upper software layers. Even though the packet is lost, the network has maintained it's integrity.

A bad channel is still considered good by the original transmitting station. To correct this condition, the received next hop channel is checked with the expected next hop channel in the hop table. If a mismatch occurs, the channel is considered bad and is marked. When the original transmitting station detects a mismatch in the hop channel, it marks the channel bad in its hop table and this channel is not used in any further network transmissions. The value in the next hop channel field takes precedence over the value in the hop table. If the original transmitting station tries to use the bad channel, the same recovery method as before is used. The receiving stations will switch to a known bad channel if directed by the Network header to simplify the error recovery.

Pseudocode

The embodiment of the invention described above may be implemented using hardware, or software in the network stations. Pseudocode of software for implementing the embodiment of this invention described above follows:

Pseudocode for the Normal Operation of a Network Station (See FIG. 1)

---

Pseudocode for the Normal Operation of a Network Station (See FIG. 1)

Presuming that the network has been newly started at 100:
    Synchronize with network at 102 (see pseudocode relating to FIG. 2)
        if network is established, enter the idle state at 104
            wait
        if watch dog timer expires, synchronize with network
        else
        data transfer request is received
        transfer data at 106
        when data transfer is complete, return to idle state Pseudocode for Synchronization (See FIG. 2)

1. Scan all channels for activity
        if activity detected, join network and exit synchronization state
            exit
        else
2. Select first hop channel
        issue SYNC REQUEST
        wait for SYNC ACKNOWLEDGE
        if SYNC ACKNOWLEDGE received, join network and exit synchronization state
            exit
        else if timer expired
            go to next hop channel
            if at end of hop table,
        return to scanning all channels for activity (go to 1.)
            Else return to issuing SYNC REQUEST (go to 2.)

---

Pseudocode for Synchronization of a Network with a Server (FIG. 3)

1. Scan all channels for activity
   if activity detected
   2. Check if server in domain
      if there is no server, join network and exit SYNC state
         exit
      else issue server SYNC REQUEST
         if SYNC ACKNOWLEDGE with server address received,
join network and   exit SYNC state
            exit
         else
         reset server flag, join network and exit SYNC state
            exit
   else select first hop channel

---

-continued

Pseudocode for Synchronization of a Network with a Server (FIG. 3)

3. Issue SYNC REQUEST
    wait for SYNC ACKNOWLEDGE
      if SYNC ACKNOWLEDGE received, go to check if server in
domain (go to 2.)
        else if timer expired,
          go to next hop channel
          if at end of hop table, go to scan all channels
for activity (go to 1.)
        else
          Go to issue SYNC REQUEST (go to 3.)

---

As will be well appreciated by those skilled in the art this pseudocode can be used to produce a software program that can be used to program data processing systems so that they can be used as stations in a network described above. The software can be stored in the data processing system storage or memory and used by its CPU (central processing unit) to operate in accordance with the invention.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters patent is:

1. A method of information transmission over a medium for a wireless communication system comprising a network of stations capable of sending and receiving data transmissions over a number of communication channels of said medium, comprising:
    assembling a data packet comprising a header and a data portion, said header comprising identification (ID) of said network, identification of the next channel to be used in communications, an address, a channel busy count field, a network command, and said data portion comprising data; and
    sending said data packet.

2. The method of claim 1 wherein said address comprises the specific address of a receiving station of the network at which information in the transmission is intended to be received.

3. The method of claim 1 wherein said address comprises a broadcast address which enables all the stations of the network to receive said information in said transmission.

4. The method of claim 2 in which said data portion of said packet comprises a data packet for another network to which said receiving station is connected for processing by said receiving station.

5. The method of claim 4 wherein said data packet comprises a token ring packet for use in a token ring network.

6. The method of claim 4 wherein said data packet comprises a Ethernet packet for use in an Ethernet network.

7. The method of claim 1 in which each station in said network maintains a channel hopping table which indicates the sequence of channels to be followed for transmission.

8. The method of claim 7 in which said channel hopping table includes a channel busy field/count.

9. The method of claim 8 further comprising the steps at each station of:
    listening for activity on a current channel;
    sending a synchronization request transmission if no activity is detected within a preset time;
    waiting for an acknowledgement to said synchronization request transmission;

choosing the next channel on said channel hopping table if no acknowledgement is received;

repeating said sending, waiting and choosing until an acknowledgement is received on a chosen channel; and synchronizing on said chosen channel once an acknowledgment has been received.

10. The method of claim 9 further comprising, upon detection of activity on a channel, said station attempting to decipher the header of a detected transmission packet.

11. The method of claim 10 further comprising said station marking said channel as inoperative if said attempting to decipher fails.

12. The method of claim 11 in which said station maintains a bad channel counter and wherein said marking comprises incrementing said bad channel counter each time a problem with the detection of a suitable signal is encountered; and marking said channel inoperative if said bad channel counter reaches a predetermined counter limit.

13. The method of claim 12 further comprising resetting said bad channel counter to zero if said channel is subsequently used successfully.

14. A method for a station having a first domain ID to join a network comprising the steps of:

monitoring channel activity for at least one transmissions including at least one transmission domain ID;

upon detection of a transmission, determining if said transmission domain ID matches said first domain ID;

joining the network communicating on said channel if said transmission domain ID matches said first domain ID;

sending a synchronization request of the network medium if said transmission domain ID does not match said first domain ID;

waiting for an acknowledgement having an acknowledgement domain ID upon said sending;

comparing said acknowledgement domain ID to said first domain ID; and joining the network communicating on said channel if said acknowledgement domain ID matches said first domain ID.

15. The method of claim 14 comprising, after joining said network, said station sending packets of information to other stations on said networks and receiving packets of information from other stations on said network.

16. The method of claim 7 wherein said channels in said channel hopping table are contiguous but ordered using a pseudo-random generator which makes use of the ID of the network as a seed to generate the order of channels in said channel hopping table.

17. A communication network in which at least one data transmission is conveyed over a number of wireless channels to a plurality of stations in said network comprising:

means for establishing a channel hopping table in each station, said table including a plurality of channels including a first and a plurality of successive channels;

means for selecting the next successive channel for communication in said table in response to receipt of instructions from one of said plurality of stations;

means for selecting the next successive channel in the table in response to a lapse of a predetermined time period between detection of decipherable signals along one of said plurality of channels;

means for indicating that specific channels in the table are inoperative; and means for accessing previously indicated inoperative channels when the number of inoperative channels falls below a predetermined threshold.

18. Apparatus as in claim 17 wherein said means for establishing said table comprises a pseudo-random generator adapted to use the ID of a network as a seed for generating the order of channels in said table.

19. The apparatus in claim 17 wherein said apparatus comprises at least one storage medium containing program modules for the establishment of said means indicated.

20. A program product comprising:

a data processing machine-useable medium having machine readable program code means embodied therein for enabling data transmission of a network station over a number of wireless channels in a medium, the program code means in said computer program product comprising:

program code means for establishing a channel hopping table in each station;

program code means for selecting the next operative channel for communication in said table in response to receipt of instructions from another station;

program code means for selecting the next channel in the table in response to a lapse of a predetermined time period between detection of decipherable signals;

program code means for indicating that specific channels in the table are inoperative;

program code means for accessing previously indicated inoperative channels when the number of inoperative channels falls below a predetermined threshold.

21. The program of claim 20 wherein said program code means for establishing said table comprises a program code means for establishing a pseudo-random generator adapted to use the ID of a network as a seed for generating the order of channels in said table.

* * * * *